Sept. 23, 1952  A. GOULDING, JR  2,611,150
APPARATUS AND METHOD FOR PERFORMING SHEETING OR
COATING OPERATIONS ON OR WITH PLASTIC MATERIAL
Filed April 26, 1949  3 Sheets-Sheet 1

Inventor
ALBERT GOULDING, JR.

By  R. H. Waters

ATTORNEY

Sept. 23, 1952　　　　　A. GOULDING, JR　　　　　2,611,150
APPARATUS AND METHOD FOR PERFORMING SHEETING OR
COATING OPERATIONS ON OR WITH PLASTIC MATERIAL
Filed April 26, 1949　　　　　　　　　　　　　3 Sheets-Sheet 3

Inventor
ALBERT GOULDING, JR.

By R. H. Waters

ATTORNEY

Patented Sept. 23, 1952

2,611,150

UNITED STATES PATENT OFFICE 2,611,150

APPARATUS AND METHOD FOR PERFORMING SHEETING OR COATING OPERATIONS ON OR WITH PLASTIC MATERIAL

Albert Goulding, Jr., Cuyahoga Falls, Ohio, assignor to Wingfoot Corporation, Akron, Ohio, a corporation of Delaware Application April 26, 1949, Serial No. 89,618

12 Claims. (Cl. 18—2)

This invention relates to apparatus and method adapted to perform sheeting and/or coating operations on or with plastic or formable material, and, more particularly, is concerned with calenders for forming plastic sheeting of uniform thickness transversely.

It has been the standard practice in rubber and other arts to form calender and like rolls with substantially cylindrical surfaces which are slightly crowned, that is, the rolls are a few thousandths of an inch greater in diameter near their centers than they are at the ends of their working faces, the crown being in the form of a flat curve well understood by those skilled in the art. The object of crowning calender and like rolls is that when a pair of the crowned rolls are in cooperating working relation on plastic being sheeted or otherwise treated between the rolls, the pressure of the plastic on the rolls is such as to slightly deflect the rolls and bring the surfaces thereof into parallel relationship with each other to form a sheet of uniform thickness transversely.

The advantages of crowned calender rolls have long been realized and appreciated in the art. However, operations upon plastics of different physical characteristics, consistency and hardness, and upon different gauges of even exactly the same plastic and under identical temperature and speed conditions immediately result in different pressures upon a pair of cooperating rolls, and a crown on the roll which was satisfactory for one gauge, speed, and particular plastic, is usually not right for operations upon another type or kind of plastic, and, as noted, may not even be correct for operations upon the same plastic but in different gauges or speeds. The operating pressures on the rolls as created by the plastic material being worked are apt to be such that the crowns are too great or are not great enough so that the plastic will either be thick at the edges and thin in the center, or thick at the center and thin at the edges.

In certain plastic sheeting or working operations, variations in the thickness transversely of the sheet of a few thousandths or ten thousandths of an inch may not be particularly objectionable. However, in operations upon polyvinyl chloride and other similar plastics where the plastic material is being calendered into sheets for use as shower curtains, dress or raincoat material, or the like, and where the sheet is relatively thin, variations in the thickness of a few ten thousandths of an inch are observable and may render the sheeted material of second grade. As a matter of fact, plastic calendering operations of the type last described have offered tremendous technical problems. Calendering operations must be rendered uniform to a point almost impossible to attain in production. Roll temperatures must be maintained almost exactly constant. Fluctuations of a few degrees destroy the uniform character of the calendered sheet. Roll speeds must likewise be held within very narrow limits. High spots and low spots in the rolls which in normal calendering operations are not even noticed, become apparent and may render the calendered sheet unsatisfactory.

Backup rolls have been utilized in the steel industry to back up and support relatively small diameter working rolls, but this combination is primarily for the purpose of permitting a greater reduction in each pass of the sheet material through the working rolls, and is not adapted to control the crown of the working rolls. The use of backup rolls in calendering operations of the type herein particularly considered does not appear to be feasible among other reasons because the backup rolls may mark the working rolls objectionably in that the marking is passed along to the sheeted product. In the manufacture of polyvinyl chloride and like plastic sheeting, the finishing rolls of the calender are provided with a sand blasted or other surface to give a touch or feel to the sheeted plastic which is deemed essential to the trade.

It is the general object of the invention to avoid and overcome at least some of the difficulties of and objections to known sheeting or coating operations, by the provision of calender and like rolls in which the crown of at least one of a pair of cooperating rolls can be controlled or adjusted during the operation of the rolls to achieve substantial uniformity of transverse thickness of the material being operated upon between the rolls.

Another object of the invention is the provision in a calender for sheeting plastic of controllable pressure means in association with the roll journals for applying pressure to a pair of rolls to camber the longitudinal axes thereof in controllable amount so that the cooperating work surfaces of the rolls can be positioned substantially equal distances apart over their entire length or can be positioned closer together near their centers, or closer together near their ends.

Another object of the invention is to provide in apparatus of the type described a pair of cooperating rolls having substantially cylindrical work surfaces which when subjected to sheeting or coating loads or other operating conditions are farther apart at their centers than at their edges, together with means operative through the bearings for the rolls and adapted to camber at least one of the rolls adjustably up to a point where the cooperating surfaces of the rolls are closer together at their centers than at their edges.

Another object of the invention is the provision of a calender including mechanism providing an over-all control for eliminating calendered stock which is thick at its edges and thin at the center or thin at the edges and thick at its center.

The foregoing objects of the invention, and other objects which will become apparent as the description proceeds, are achieved by the provision of apparatus for performing sheeting or coating operations on or with plastic material including a pair of cooperating rolls, cooperating substantially cylindrical surfaces on the rolls of a contour such that the surfaces will be farther apart at their centers than at their edges when the rolls are operating on the plastic materials, journals on the rolls, bearings for the journals, pressure means operating upon the roll journals to camber the longitudinal axis of at least one roll, and means controlling the pressure of the pressure means to move the cooperating substantially cylindrical surface of the roll under operating conditions into substantial parallelism with the cooperating surface of the cooperating roll.

For a better understanding of the invention, reference should be had to the accompanying drawings, wherein.

Figure 1:
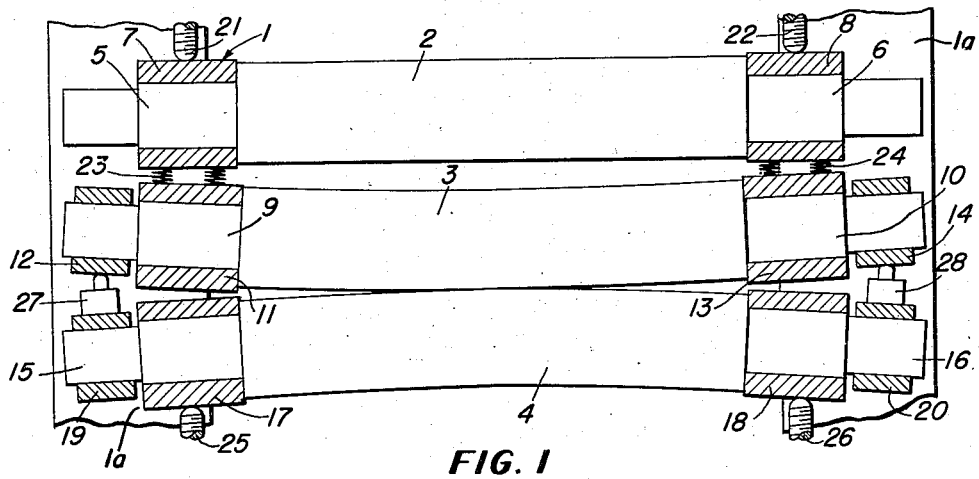
Fig. 1 is a diagrammatic illustration in vertical section for a three high set of rolls and illustrating in exaggerated form the manner in which the bottom pair of finishing rolls can be cambered towards each other by utilizing the principles of the invention.

Having more specific reference to the drawings, the numeral 1 indicates generally a calender or like apparatus including a frame 1a and having a plurality of rolls, such as rolls 2, 3 and 4, the bottom rolls 3 and 4 cooperating to perform a sheeting, coating, or like operation on or with plastic material not shown. The roll 2 is provided with integral reduced diameter journals 5 and 6 carried in bearings 7 and 8. In a like manner, the roll 3 is formed with journals 9 and 10 of smaller diameter than the roll proper, and the journal 9 is carried in a vertically fixed main bearing 11 and is provided with a second bearing 12 near its outboard end. The journal 10 of the roll 3 is received in a vertically fixed main bearing 13 and is likewise provided with an outboard bearing 14. The main bearings 11 and 13 are normally supported by the frame 1a in fixed vertical position and the remaining roll bearings in slidable vertical position. The roll 4 is formed with journals 15 and 16 of smaller diameter than the roll proper and is provided with main or inboard bearings 17 and 18 and with secondary outboard bearings 19 and 20.

Adjusting screws 21 and 22 engage the bearings 7 and 8 of the roll 2, and compression springs or other like means 23 and 24, are positioned between the bearings 7 and 8 and the stationary bearings 11 and 13 of the roll 3. Tightening down on the pressure screws 21 and 22 moves the roll 2 closer to the roll 3 with the springs 23 and 24 compressing, and slackening off on the pressure screws 21 and 22 causes the roll 2 to move away from the roll 3 under the action of the compression springs 23 and 24. In a like manner, pressure screws 25 and 26 engage with the main bearings 17 and 18 of the bottom roll 4 to move the roll 4 towards the roll 3 when the screws are tightened. When the screws 25 and 26 are backed off the weight of the roll 4 and its bearings causes the roll 4 to move away from the roll 3.

Positioned between the outboard bearings 12 and 19 and between the outboard bearings 14 and 20 of the rolls 3 and 4, are pressure exerting means 27 and 28, usually hydraulic cylinders, which when operated will move the outboard bearings apart and throw cambers into the longitudinal axes of the rolls 3 and 4 so that the centers of these rolls are moved closer together in the manner diagrammatically shown in exaggerated form in Fig. 1.

For purposes of illustration, and without being limited thereto, in a test operation upon typical calender rolls having a diameter of twenty-four inches, and a working face having a length of sixty-eight inches, hydraulic pressure cylinders with a diameter of six inches and utilizing pressures of up to two thousand pounds per square inch in the cylinders gave deflections at the center of each calender roll of over .0015 inch, and total deflections between cooperating calender rolls of over .003 inch, and the exact amounts of deflection could be accurately controlled by varying the pounds per square inch pressure supplied to the cylinders.

It will be recognized that the relatively small deflections obtained are greatly exaggerated in Fig. 1 of the drawings to better illustrate the principles involved. However, it is to be understood that deflections of the indicated amounts are adequate in plastic sheeting operations upon polyvinyl chloride and like materials to render the calendered materials of overall uniformly satisfactory thickness transversely of the sheet.

Figure 2:
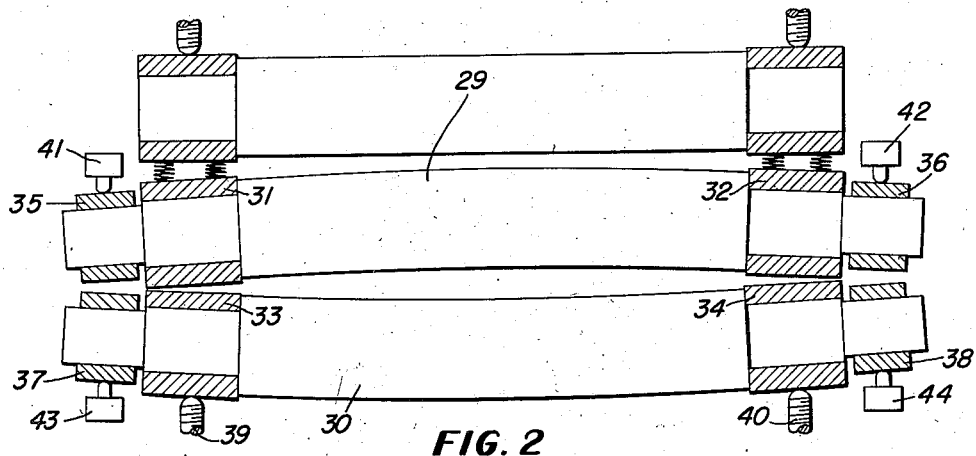
Fig. 2 is a view similar to Fig. 1 but illustrating the manner in which the bottom pair of finishing rolls can be cambered away from each other.

Having reference to the form of the invention shown in Fig. 2 of the drawings, the numerals 29 and 30 indicate calender or like rolls having inboard bearings 31, 32 33 and 34 and outboard bearings 35, 36, 37 and 38. The inboard bearings 31 and 32 are fixed in the frame of the apparatus, and the inboard bearings 33 and 34 may be adjusted to and from the inboard bearings 31 and 32 by means of adjustment screws 39 and 40 to provide for the proper clearance between the calender rolls. Additionally, the outboard bearing 35 is provided with an adjustable pressure means, such as a hydraulic cylinder 41, positioned to direct its force downwardly upon the outboard bearing 35, the outboard bearing 36 is provided with a downwardly directed adjustable pressure means, such as a hydraulic cylinder 42, the outboard bearing 37 is provided with an upwardly directed adjustable pressure means, such as a hydraulic cylinder 43, and the outboard bearing 38 is provided with an upwardly directed adjustable pressure means, such as a hydraulic cylinder 44. The application of pressure to the means 41, 42, 43 and 44, will effect a cambering of the rolls away from each other in the manner diagrammatically exaggerated in Fig. 2.

Figure 3:
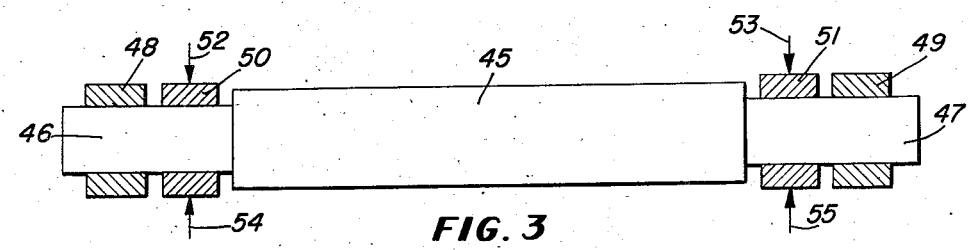
Fig. 3 is a view similar to Figs. 1 and 2 but illustrating a single roll, and diagrammatically indicating a modified manner in which the roll can be cambered through the bearings or journals thereof.

The invention also contemplates, as exemplified in Fig. 3, providing a roll 45 with journals 46 and 47, the journals being carried in fixedly positioned outboard bearings 48 and 49. The application of adjustable pressure means, such as hydraulic cylinders, to inboard bearings 50 and 51, which are carried by the journals 46 and 47 respectively, in the direction shown by the arrows 52 and 53, will effect a downward cambering of the roll 45. Or adjustable pressure means, such as hydraulic cylinders, can be directed upwardly to the inboard bearings 50 and 51, in the direction of the arrows 54 and 55, to effect an upward cambering of the roll 45.

Of the several embodiments of the invention illustrated in Figs. 1 to 3, one of the most convenient and practical is that diagrammatically illustrated in Fig. 1. This form of the invention requires only a single pair of adjustable pressure means in addition to the usual manually adjusted pressure screws, and has been proven in practice, as noted above, the provide adequate overall adjustment of roll parallelism across their entire working faces under operating pressures.

Figure 4:
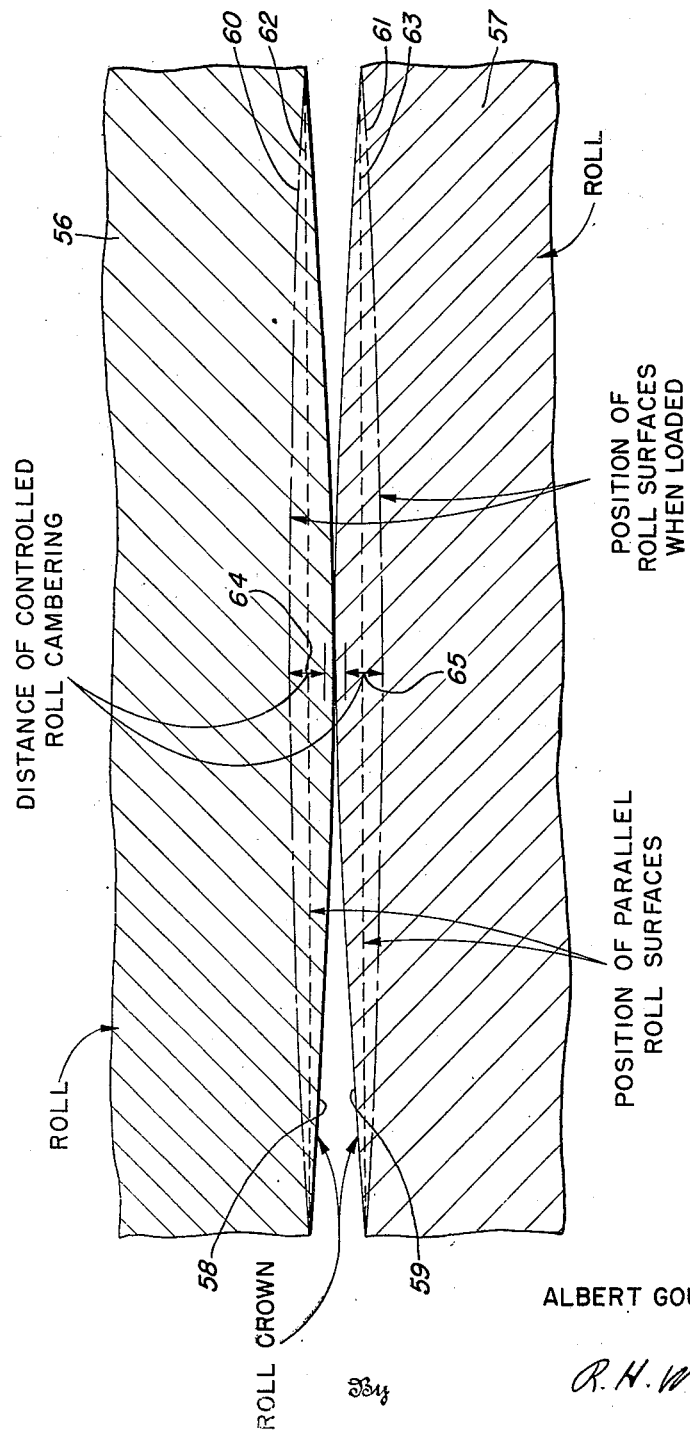
Fig. 4 is an enlarged diagrammatic and exaggerated longitudinal vertical section through a pair of cooperating roll surfaces and illustrating the principles of the invention as they appear in operation at the working surfaces of the rolls.

Fig. 4 illustrates in more detailed form the principle of the roll cambering action provided by the invention, and specifically employed in the combination of apparatus shown in Fig. 1. More particularly, in Fig. 4, the rolls have been indicated by the numerals 56 and 57. The rolls 56 and 57 have working surfaces or roll crowns indicated respectively by the numerals 58 and 59. Even in Fig. 4, the roll crowns have been exaggerated to better exemplify the principles of the invention. In accord with the teaching of the invention, the roll crowns 58 and 59 are such that when the rolls 56 and 57 are subject to operating pressures upon a plastic, these surfaces will move to positions indicated by the chain dotted lines 60 and 61. It is herein that the present invention differs in principle from the conventional practice. Specifically, it is the conventional practice to so form the curvature of the working faces of the rolls, that is, the roll crowns, so that when the rolls are subjected to operating pressures, the working surfaces of the rolls will be in substantial parallelism over their entire length. As distinct from this conventional practice, is that of the present invention wherein the roll crowns or working surfaces of the rolls are such that when the rolls are subjected to operating pressures, the working surfaces of the rolls will be moved to the lines 60 and 61 which are definitely farther apart near their centers than at the ends of the rolls. This is made clear in Fig. 4 which indicates in dotted lines 62 and 63 where the working surfaces of the rolls would be if they were in parallel relation to each other.

The flatter crowns 58 and 59 on rolls 56 and 57, which cause the working surfaces of the rolls to move to the lines 60 and 61, is for the reason that when the cambering pressure is applied to the rolls through their journals, the working surfaces of the rolls can be moved back to or through a position of parallelism of the working faces of the rolls, the position of parallelism being shown, as noted, by the lines 62 and 63.

In Fig. 4, the numeral 64 indicates the dimension that the working face of the roll 56 can be moved by the adjustable pressure cambering means, and the numeral 65 indicates the similar distance that the roll 57 can be moved. This is important for the reason that movements of the working faces of the rolls in the distances 64 and 65 to both sides of the parallel lines 62 and 63 by means of the adjustment of the roll cambering mechanism results in allowing for correction of transverse gauges of sheeted plastic or coated plastic to correct for either thick or thin at the center or thin or thick at the edges. Thus, high utility of over-all adjustment for transverse thickness is achieved by relatively simple means under actual calendering operating conditions, and without interfering with the operation. The gauge is rendered much more uniform transversely and production of inferior goods in prevented, and this is true regardless of calender speeds, temperatures, gauges being operated upon, and the like, within relatively wide limits.

Figure 5:
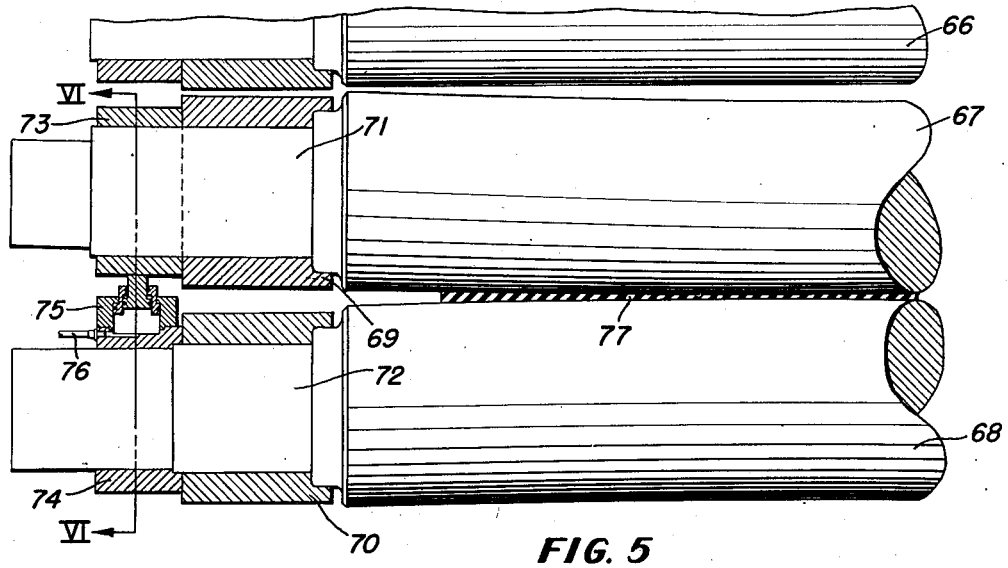
Fig. 5 is a more specific rendition of particular apparatus utilized in the practice of the invention, and illustrating in fragmentary vertical section form a calender equipped for roll cambering.

Having reference now to Fig. 5 of the drawings, one specific embodiment of the invention is illustrated as including calender rolls 66, 67 and 68. The center and bottom calender rolls are provided with main or inboard bearings 69 and 70 upon roll journals 71 and 72. Also carried upon the roll journals are auxiliary or outboard bearings 73 and 74. For purposes of simplification, the frame of the apparatus and the usual adjusting screws for adjusting roll clearance are omitted. Positioned between the outboard bearings 73 and 74 is a hydraulic pressure cylinder 75, which may be of the double telescoping type shown, this pressure cylinder being supplied with hydraulic fluid under pressure by means of a conduit 76 in order to effect cambering of the center and bottom rolls towards each other. The rolls 67 and 68 are shown as performing an operation upon a plastic stock 77, the amount of cambering of the rolls being somewhat exaggerated in the illustration.

Figure 6:
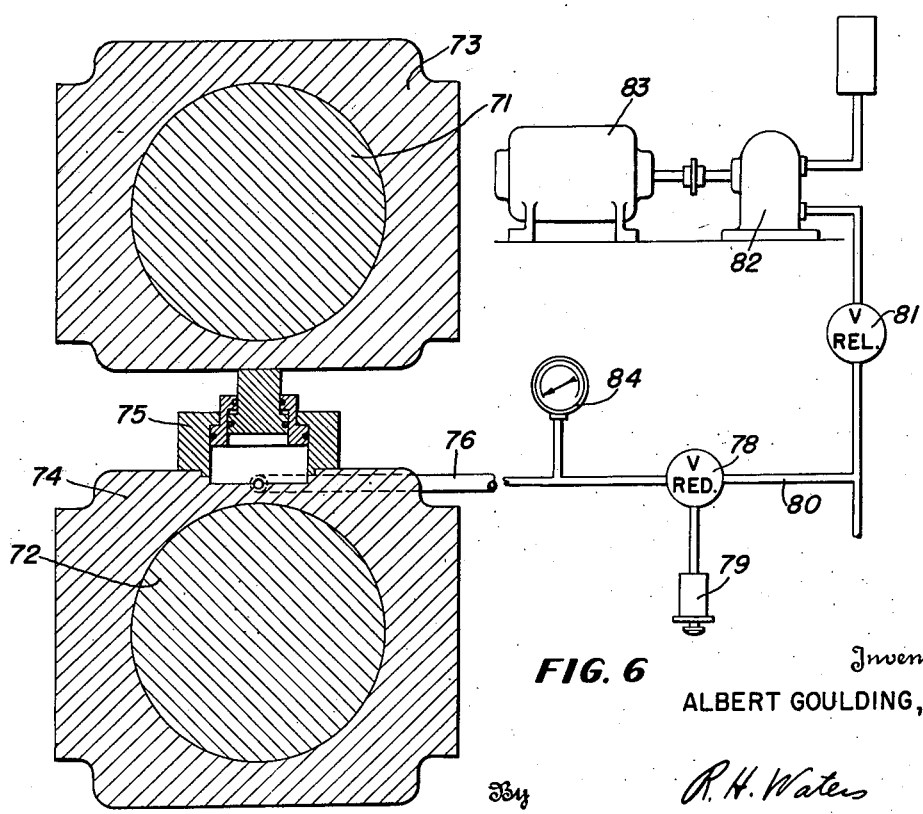
Fig. 6 is a diagrammatic illustration of the control apparatus associated with the pressure means for effecting the roll cambering action.

Fig. 6 is an enlarged vertical transverse sectional view taken on line VI—VI of Fig. 5 and illustrates the roll journal 71 received in its outboard bearing 73, and the roll journal 72 received in its outboard bearing 74. The hydraulic pressure cylinder 75 positioned between the outboard bearings 73 and 74 is connected by the conduit 76 to a reducing valve 78 controlled by means 79, the reducing valve 78 being connected through conduit 80, valve 81 to hydraulic pump 82 driven by a motor 83. A pressure gauge 84 is connected in the conduit 76 to indicate the pounds per square inch in the hydraulic cylinder 75.

It will be recognized that the objects of the invention have been achieved by the apparatus illustrated and described. Adjustable cambering of calendar and like rolls is achieved which is well within the elastic limits of the materials of the rolls, and which is well within operative bearing loads so that the apparatus can be operated in accord with conventional practice over long periods of time without failure. The invention provides for an easy adjustment of gauge thickness transversely of the sheet being formed or worked in order to provide for uniform transverse gauge, and the adjustment can be made while the rolls are operating. Operations upon plastic at different speeds and temperatures, as well as upon different gauges or character of stock are possible within relatively wide limits without necessitating changing of rolls to provide for different roll crowns.

The term "camber" as employed in the specification and claims is intended to mean bending, curving, or deflecting the axis of the roll or rolls to effect a controlled or desired crown on the working surface of the roll or on the working surfaces of the rolls at the roll areas where the plastic material being rolled is operated upon to determine the gage thereof.

While certain representative embodiments and details have been shown for the purpose of illustrating the invention, it will be apparent to those skilled in this art that various changes and modifications may be made therein without departing from the spirit or scope of the invention.

I claim:

1. In combination, a pair of cooperating rolls adapted to finish form a sheet between the rolls, journals on the ends of the rolls, a pair of bearings on each journal, means for holding one of each pair of bearings stationary, hydraulic pressure means engaging with the other one of each pair of bearings, and control means for supplying controlled amounts of hydraulic pressure to the hydraulic pressure means to throw a deflection of adjustable amount into the longitudinal axes of the rolls.

2. In combination, a pair of cooperating rolls adapted to finish form a sheet between the rolls, journals on the ends of the rolls, a pair of bearings on each journal, means holding one of each pair of bearings stationary, adjustable pressure means engaging with the other one of each pair of bearings to throw a deflection of adjustable amount into the longitudinal axes of the rolls.

3. In combination, a pair of cooperating rolls adapted to finish form a sheet between the rolls, journals on the ends of the rolls, bearing means engaging the journals, means engaging the bearing means to retain a portion thereof against movement in a direction normal to the longitudinal axis of the rolls, and adjustable pressure means engaging the bearing means in longitudinally spaced relation to the first mentioned means to impart a selected crown to the cooperating portions of the rolls.

4. In combination, a pair of cooperating rolls adapted to form a sheet between the rolls, journals on the ends of the rolls, bearing means engaging the journals, fixed fulcrum means engaging a portion of the bearing means of at least one roll to retain at least such portion of same in a fixed position, and adjustable pressure means engaging the bearing means of at least the said one roll spaced longitudinally from the fixed fulcrum means to impart a camber to the longitudinal axis thereof.

5. In combination in a calender for operations upon plastic and the like, a pair of cooperating rolls, fulcrum means for the rolls adjacent the ends thereof, pressure means operating on the roll ends in conjunction with the fulcrum means for imparting controlled cambers to the working faces of the rolls, said fulcrum means and pressure means being relatively displaced along the axis of the roll, and means for adjusting the rolls to and from each other.

6. Apparatus for calendering plastic sheets including a pair of cooperating rolls, journals on the ends of the rolls, bearings for the journals, means holding the inboard portions of the bearings fixed, hydraulic cylinder means positioned between the outboard portions of the bearings, and control means for supplying selected amounts of hydraulic pressure to the hydraulic cylinder means to change the crowns of the cooperating portions of the rolls and to hold the crowns as changed.

7. Apparatus for calendering plastic sheets including a pair of cooperating rolls, journals on the ends of the rolls, bearings for the journals, means holding the inboard portions of the bearings fixed, expansible means positioned between the outboard portions of the bearings, and control means for operating the expansible means to change the crowns of the cooperating portions of the rolls and to hold the crowns as changed.

8. Apparatus for calendering plastic sheets, or the like, and including a roll, journals on the ends of the roll, bearings for the journals, means holding one portion of each bearing fixed, hydraulic cylinder means engaging with another portion of each bearing, and control means for supplying selected amounts of hydraulic pressure to the hydraulic cylinder means to change the crown of the roll and to hold the crown as changed.

9. A calender for sheeting plastic and performing like operations, and including a plurality of cooperating rolls and at least a pair of finishing rolls, crowns on the finishing rolls of a curvature such that when the rolls are loaded the cooperating roll surfaces will be farther apart at their centers than at their edges, journals on the finishing rolls, bearings for the journals, fulcrum means for the roll journals, said fulcrum means holding a portion of each bearing fixed, at least a pair of hydraulic cylinders, one engaging with a portion of each bearing at a point displaced from the fulcrum means along the axis of the roll, said hydraulic cylinders applying through the journals to the finishing rolls cambering forces of sufficient strength to move the cooperating roll surfaces so that their centers are closer together than their edges, and means controlling the hydraulic pressure applied to the hydraulic cylinders to camber the finishing rolls to render a sheet calendered thereby of uniform thickness transversely.

10. Apparatus for performing sheeting or coating operations on or with plastic material including a pair of cooperating rolls, cooperating substantially cylindrical surfaces on the rolls of a contour such that the surfaces will be farther apart at their centers than at their edges when the rolls are operating on the plastic material, journals on the rolls, bearings for the journals, fulcrum means for the roll journals, said fulcrum means holding a portion of each bearing fixed, pressure means operating upon the roll journals, said pressure means exerting a force at a point displaced along the axis of the roll from the fulcrum means to camber the longitudinal axis of at least one roll, and means controlling the pressure of the pressure means to move the cooperating substantially cylindrical surface of the roll under operating conditions into substantial parallelism with the cooperating surface of the cooperating roll.

11. Apparatus for performing sheeting or coating operations on or with plastic material including a pair of cooperating rolls, cooperating substantially cylindrical surfaces on the rolls of a contour such that the surfaces will be farther apart at their centers than at their edges when the rolls are operating on the plastic material, journals on the rolls, bearings for the journals, fulcrum means for the roll journals, said fulcrum means holding a portion of each bearing fixed, pressure means operating upon the roll journals, said pressure means exerting a force at a point displaced along the axis of the roll from the fulcrum means to camber the longitudinal axis of at least one roll, and means controlling the pressure of the pressure means and capable of moving the cooperating substantially cylindrical surface of the said one roll under operating conditions to a point where the cooperating surfaces of the rolls are closer together at their centers than at their edges.

12. That method of forming sheet material to a desired gauge which is substantially of uniform thickness transversely of the sheet which includes the steps of rolling the sheet material between a pair of rolls, adjusting the rolls to and from each other at their ends to produce substantially the same gauge at each side of the sheet, bending at least one roll into arcuate shape by pressure applied to the ends of the roll, and controlling the amount of bending to bring the surfaces of the rolls into substantial parallelism regardless of the pressure required to effect the sheeting of the material.

ALBERT GOULDING, Jr.

REFERENCES CITED

The following references are of record in the file of this patent:

UNITED STATES PATENTS

| Number | Name | Date |
| --- | --- | --- |
| 1,500,679 | Midgley | July 8, 1924 |
| 1,781,809 | Detwiler | Nov. 18, 1930 |
| 2,174,195 | Norris | Sept. 26, 1939 |

FOREIGN PATENTS

| Number | Country | Date |
| --- | --- | --- |
| 501,883 | Great Britain | Mar. 7, 1939 |
| 528,671 | Great Britain | Nov. 4, 1940 |
| 644,957 | Germany | May 19, 1937 |